United States Patent Office
3,718,343
Patented Feb. 27, 1973

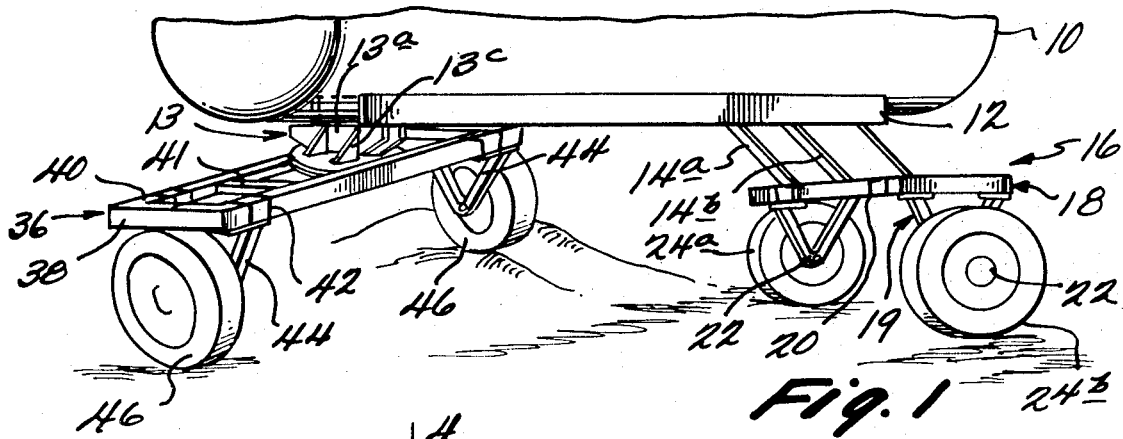
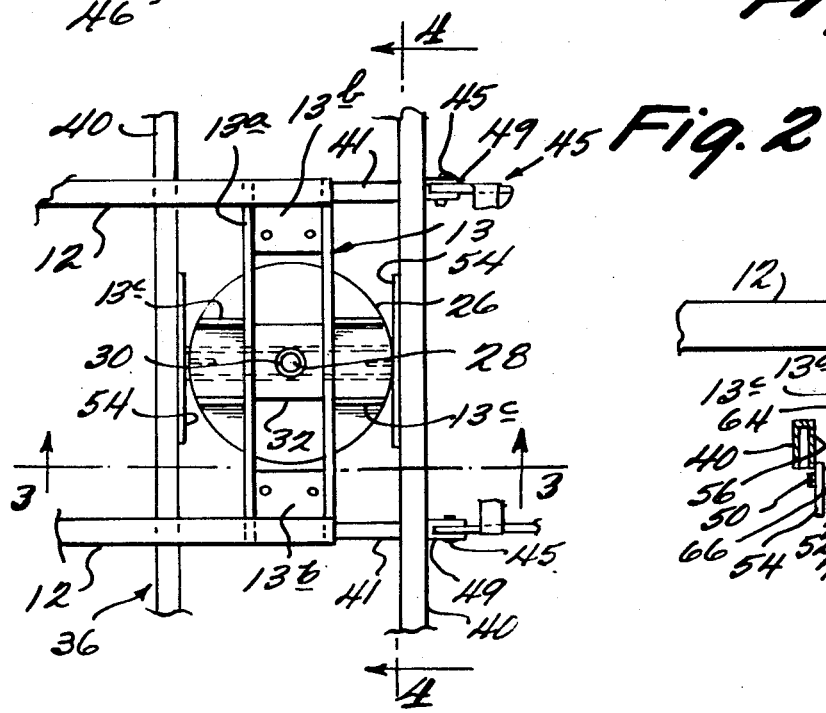
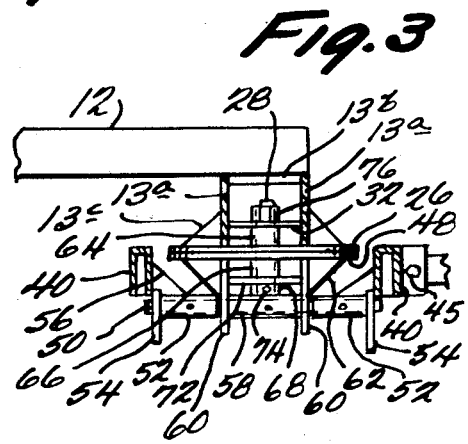
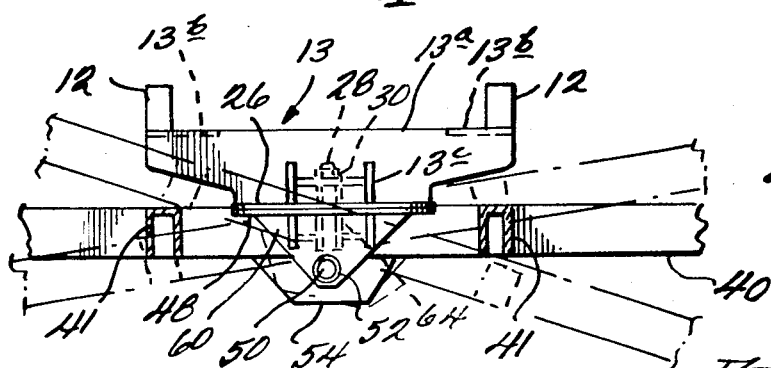

3,718,343
AMMONIA TRAILER IMPROVEMENTS
Franky D. Mills, Plainview, Tex., assignor to The Hamby Company, Plainview, Tex.
Filed Apr. 14, 1971, Ser. No. 134,019
Int. Cl. B62d *53/08*
U.S. Cl. 280—116                                 3 Claims

ABSTRACT OF THE DISCLOSURE

The front wheels of a trailer are carried by a rigid frame which is attached to the front end of the trailer frame by a fifth wheel unit which permits steering movement of the front wheel frame relative to the trailer frame. The front wheel frame is pivotable relative to the fifth wheel unit for tilting movement about an axis which is parallel to the direction of front wheel travel.

BACKGROUND OF THE INVENTION

(1) Field of the invention

This invention relates to a fifth wheel coupling by which a trailer frame is pivotally connected to the front wheel support frame of the trailer to permit turning movement of the wheel frame, and in particular, it relates to improved constructions in which a longitudinal pivot axis is included to permit relative rocking movement between the trailer frame and the front wheel frame.

(2) Description of the prior art

It has long been known to connect the frame of a trailer to the front wheel support frame for the trailer wheels by a fifth wheel unit which allows relative pivotal movement in horizontal planes between the trailer frame and the front wheel support frame.

It is further known to provide a longitudinal pivot axis in the form of a pin between the trailer frame and the upper part of the fifth wheel unit so that when one front wheel is raised above the other front wheel and the front wheel support frame is tilted, the trailer frame tends to remain in a horizontal plane.

Such a system works well when the front wheels of the trailer are pulled in an essentially straight line. However, when the front wheels are pulled at a significant angle with respect to the longitudinal axis of the trailer frame, the longitudinal pivot axis, which is fixed with respect to the trailer frame, becomes less efficient. This is because when the front wheels are turned with respect to the trailer frame and one of the wheels encounters a depression or elevation in the terrain, only a vectorial portion of the tilt is taken up by the longitudinal pin; the other vectorial portion of the tilt is transferred as a force through the vertical pin of the fifth wheel unit to the trailer frame causing the trailer frame to tilt.

The above described disadvantage becomes quite pronounced when it is desired to pull the trailer over rough ground with the wheels turned relative to the trailer body. This situation may arise, for instance, when a heavy mobile tank unit of perhaps 1000 gallon capacity is pulled across the furrows of a field or other rough ground in order to transport liquid fertilizer, engine fuel or other materials. Under these conditions, the vertical pin is placed under high stress and is thus subject to great wear and tear.

SUMMARY OF THE INVENTION

Broadly, the invention comprises the provision of a longitudinal pivot axis disposed below the fifth wheel unit and fixed with respect to the front wheel frame so that the pivot axis turns with the front wheel frame. The axis is conveniently provided in the form of a pin and sleeve connection between the lower part of the fifth wheel unit and the front wheel frame, the pin and sleeve extending in the direction of travel of the front wheels. Since the longitudinal pin automatically follows the direction of front wheel travel, it is always in position to fully take up the tilt of the front wheel frame and thus no undue force is transferred to the fifth wheel unit or to the trailer frame to cause it to tilt. Furthermore, the axis of the fifth wheel unit remains substantially vertical and thus undue wear is prevented between the relatively movable upper and lower sections of the fifth wheel unit.

BRIEF DESCRIPTION OF THE DRAWINGS

FIG. 1 is a perspective view of a tank trailer embodying the principles of the present invention and showing the front wheels turned and traversing uneven ground;

FIG. 2 is a fragmentary top view of the front of the trailer of FIG. 1 with the tank removed and with the front wheels facing straight ahead;

FIG. 3 is a sectional view taken on the line 3—3 of FIG. 2; and

FIG. 4 is a sectional view taken on the line 4—4 of FIG. 2.

PREFERRED EMBODIMENT OF THE INVENTION

Referring to FIG. 1, there is shown a mobile tank trailer suitable for carrying liquid fertilizer, such as liquid ammonia, across rough terrain. The tank, indicated by reference numeral 10, may have a 1000 gallon capacity and is shown supported on a trailer frame comprised of two longitudinally extending, horizontally spaced-apart rails 12 which are joined by cross piece assembly 13 at the forward end and by a similar cross piece at the rear end.

At the rear end of the trailer bracing members 14a and 14b depend from the rails 12 and are bolted or otherwise rigidly attached to a rear wheel support frame 16. The rear wheel support frame 16 comprises a horizontal rectangular assembly 18 formed of steel channels to each side of which a depending angle support member 19 is fastened, as by U-bolts 20. Each of the angular wheel support members 19 carries an axle section 22 at its apex, and the rear wheels 24 are mounted on the axle section 22 by conventional means. It will be seen that the elevation of the frame 16 above the rear wheels and the absence of a common rear axle provides substantial ground clearance.

The cross piece assembly 13 at the forward end of the trailer frame includes two spaced-apart vertical plates 13a disposed below and welded to the rails 12, together with two horizontal end plates 13b, which are also welded to the rails 12. A circular horizontal plate 26, forming the upper wheel section of a fifth wheel unit, is welded to the lower edges of the vertical plates 13a and is reinforced with vertical gusset plates 13c welded to the plates 13a and to the upper surface of the circular plate 26. A vertical pivot shaft 28, which defines the axis of rotation of the fifth wheel unit, extends downwardly through the center of the upper fifth wheel plate 26.

A front wheel support frame 36 includes two short longitudinal rectangular tubular members 38 and two longer rectangular tubular members 40 welded together at their ends to form a rectangular frame. Two inner tubular members 41 provide additional rigidity. Angular depending wheel support members 44 are connected to the frame as by U-bolts 42 and carry the front wheels 46 on independent axles. Connection of the trailer to a towing vehicle is accomplished by means of a tongue assembly 45 which is pivoted for swinging movement relative to the front wheel frame 36 by bolts 47 passing through brackets 49 fixed to the front frame member 40.

The lower wheel section of the fifth wheel unit includes a circular plate 48 pivotally mounted for tilting movement about an axis which is parallel to the direction of travel of the front wheels 46 and which intersects the axis of the fifth wheel unit. In the illustrated embodiment, the tilting axis is defined by a pin 50 having its opposite ends carried in two sleeve journals 52 fixed to plates 54, which are rigidly secured to and depend from the frame members 40, as best shown in FIG. 3. Gusset plates 56 are welded to the plates 54 and to the sleeve journals 52.

The lower fifth wheel plate 48 is mounted for rotation about the pin 50 by means of a sleeve 58 surrounding the pin 50 and welded at its ends to two vertical plates 60 which are welded along their upper edges to the lower surface of the plate 48. Reinforcing gusset plates 62 are also welded to the plate 48 and the plates 60.

The vertical pivot shaft 28 of the fifth wheel unit is disposed within three collars 64, 66 and 68. The uppermost collar 64 is welded at its lower end to the circular plate 26 and at its upper end to a horizontal stabilizing plate 70 which is welded to the vertical plates 13a. The middle collar 66 is similarly welded at its ends to the circular plate 48 and to a horizontal stabilizing plate 72. The lowermost collar 68 is pinned to the vertical shaft 28 at 74 thereby forming a head which rests on top of the horizontal sleeve 58 during assembly. After the top portion of the fifth wheel unit is installed over the threaded upper end of the shaft 28, a nut 76 is installed to clamp the shaft 28 within the fixed collars 64 and 66.

With the construction described above, it is seen from FIG. 4 that the trailer frame and the upper and lower fifth wheel plates 26 and 48 can remain in substantially horizontal planes even when the front wheel support frame 36 is tilted due to the travel of front wheels 46 over uneven ground.

Furthermore, from FIG. 1, it is seen that even when the direction of front wheel travel makes a substantial angle with respect to the longitudinal axis of the trailer frame and the front wheels 46 encounter uneven ground, the trailer frame remains substantially horizontal. This function is present because the longitudinal pin 50, being fixed with respect to the front wheel frame 36, follows the direction of front wheel travel to absorb the tilt of the front wheel frame 36 in the manner shown in FIG. 4 regardless of the orientation of the front wheels 46 with respect to the trailer frame.

It should also be noted that the high clearance between the bottom of trailer frame and the top of the front wheel support frame 36 permits the latter to be rotated more than 90° away from the longitudinal axis of the trailer frame in either direction. This latter feature is also of importance when it is desired, in field operations, to make a particularly "tight" turn.

While the above description is directed to the preferred embodiment of the invention, many modifications are possible within the scope of the invention as defined by the appended claims.

What is claimed is:

1. In a trailer structure having a body, laterally spaced-apart front wheels and laterally spaced-apart rear wheels: a front wheel frame supporting the front wheels, said front wheel frame including a main frame portion disposed above the front wheels and a separate depending support for each front wheel; a fifth wheel arrangement supporting the forward end of the body on the front wheel frame intermediate the front wheels, said fifth wheel arrangement including pivotally interconnected upper and lower fifth wheel sections disposed between the front wheel frame and the trailer body for permitting turning movement of the front wheel frame relative to the trailer body, and pivot means connected between the lower fifth wheel section and the front wheel frame for supporting the lower fifth wheel section and for permitting relative pivotal movement between it and the front wheel frame about an axis parallel to the direction of travel of the front wheels, said pivot means being disposed below said main frame portion and above the axis of rotation of the front wheels.

2. A trailer structure as in claim 1 wherein said pivot means includes a pin and a surrounding sleeve, one of which is fixed to said main front wheel frame portion and the other of which is connected to said lower fifth wheel section.

3. A trailer structure as in claim 1 wherein said body is disposed at an elevation above said front wheel frame sufficient to permit 180° rotation between the body and front wheel frame.

References Cited

UNITED STATES PATENTS

| | | | |
|---|---|---|---|
| 2,919,928 | 1/1960 | Hoffer | 280—423 A UX |
| 1,155,623 | 10/1915 | Shadbolt | 280—438 R |
| 2,967,057 | 1/1961 | Meyer | 280—5 E |
| 2,233,193 | 2/1941 | Armington | 280—423 R X |
| 2,038,265 | 4/1936 | Bradley | 280—438 R X |

FOREIGN PATENTS

| | | | |
|---|---|---|---|
| 494,189 | 6/1950 | Belgium | 280—116 |
| 556,612 | 4/1957 | Belgium | 280—5 C |

LEO FRIAGLIA, Primary Examiner

U.S. Cl. X.R.
280—5 E, 438 R